United States Patent [19]

Schneider et al.

[11] Patent Number: 5,815,085
[45] Date of Patent: Sep. 29, 1998

[54] STORAGE AND RETRIEVAL MACHINE HAVING IMPROVED REAL-TIME RESPONSIVENESS AND IMPROVED NOISE IMMUNITY

[75] Inventors: Randall M. Schneider, Pewaukee; Wesley Crucius, Brookfield, both of Wis.

[73] Assignee: HK Systems, Inc., New Berlin, Wis.

[21] Appl. No.: 558,426

[22] Filed: Nov. 16, 1995

[51] Int. Cl.$^6$ .............................. G05B 23/02; B65G 1/00; H04Q 5/22
[52] U.S. Cl. .................................. 340/825.5; 340/825.06; 414/272; 414/267
[58] Field of Search .......................... 340/825.5, 825.35; 414/270, 273, 276, 272; 300/825.06

[56] References Cited

U.S. PATENT DOCUMENTS

| | | | |
|---|---|---|---|
| 4,007,382 | 2/1977 | Warberg | 307/236 |
| 4,773,807 | 9/1988 | Kroll et al. | 414/282 |
| 4,919,057 | 4/1990 | Riley | 104/295 |
| 4,984,521 | 1/1991 | Riley | 104/290 |
| 5,044,859 | 9/1991 | Sorensen et al. | 414/273 |
| 5,091,685 | 2/1992 | Sorensen et al. | 318/652 |
| 5,187,664 | 2/1993 | Yardley et al. | 364/424.02 |
| 5,281,901 | 1/1994 | Yardley et al. | 318/587 |
| 5,341,130 | 8/1994 | Yardley et al. | 340/825.06 |
| 5,397,211 | 3/1995 | Lloyd et al. | 414/663 |
| 5,564,890 | 10/1996 | Knudsen, Jr. | 414/786 |

Primary Examiner—Michael Horabik
Assistant Examiner—Anthony A. Asongwed
Attorney, Agent, or Firm—Nilles & Nilles, S.C.

[57] ABSTRACT

A communication system for a storage and retrieval machine comprises a conductor bar, base and carriage electrical devices, a sliding brush, first and second transmitters, and first and second receivers. The sliding brush is mounted to the carriage and is in slidable electrical contact with the conductor bar. The transmitters and receivers are coupled to the conductor bar or the sliding brush, depending on the direction of transmission. The first and second transmitters transmit positive half-waves and negative half-waves, respectively, across the conductor bar in response to inputs. Hence, two one-bit intra SRM communication links are provided between the SRM carriage and base. A communication system for communicating high priority and low priority messages between a base and carriage of an SRM comprises base and carriage electrical devices, and first and second communication links. Specifically, the first communication link includes a conductor bar, a sliding brush, and a first transmitter and first receiver which are coupled to either the conductor bar or the sliding brush, depending on the direction of transmission. The first communication link communicates high priority messages. The second communication link, which includes first and second optical modems on the carriage and base, respectively, communicates the low priority messages. The present invention advantageously permits increased real-time responsiveness of the SRM control system, enjoys increased noise immunity, and uses low maintenance components.

20 Claims, 4 Drawing Sheets

STORAGE AND RETRIEVAL MACHINE HAVING IMPROVED REAL-TIME RESPONSIVENESS AND IMPROVED NOISE IMMUNITY

FIELD OF THE INVENTION

The present invention relates generally to storage and retrieval machines, and in particular to storage and retrieval machines having a communication system which permits improved real-time responsiveness and improved noise immunity.

DESCRIPTION OF RELATED ART

Storage and retrieval machines are well known, inter alia, for retrieving load objects from warehouse racks and transporting them to distant destinations. A storage and retrieval machine (SRM) comprises a base, a mast, a carriage which is movable on a vertical path along the length of a mast, and a shuttle mounted on the carriage. The base, and thereby the SRM, travels along a rail to selected locations in an aisle path adjacent to the stacked storage racks. At each aisle location, the carriage is driven vertically to a selected one of the storage racks. At the selected rack, the shuttle (which comprises a series of plates) is driven in telescoping fashion into the selected rack to deliver or retrieve a load object. The shuttle thus acts in conjunction with the base and the carriage to deposit a load object in (or retrieve from) a storage rack.

Typically, a computer mounted on the base implements a supervisory control which provides for overall control of the SRM. In order for the SRM to be properly controlled, it is necessary to provide a communication link between the supervisory control and a plurality of other devices. The supervisory control communicates with a base controller which controls the motion of the base down the aisle, and a hoist controller which controls the hoisting of the lift carriage. Since the base and hoist controller are located adjacent the supervisory control, providing a communication link between the three devices is not problematic.

However, the supervisory control must also communicate with a shuttle controller and with a plurality of discrete I/O, which are located on the carriage of the SRM. The shuttle controller controls the extension and retraction of the shuttle plates. The supervisory control must communicate with the shuttle controller, for example, so that the extension and retraction of the shuttle may be carefully coordinated with the motion of the base and the carriage. Obviously, it would be undesirable for the base to start leaving a rack location if the shuttle has not yet retrieved the load, thereby causing a collision of the extended shuttle with the rack structure. Additionally, there is a large amount of discrete I/O located on the carriage which must be communicated to the supervisory control. Indeed, the discrete I/O is often connected to the shuttle controller, which then communicates the I/O to the supervisory control. The discrete I/O includes a plurality of photo eyes, limit switches, safeties, and so on. Relatedly, in some situations, it is desirable to provide an operator cage on the SRM carriage. An operator in the cage is then permitted to communicate with the supervisory control and thereby control the horizontal movement of the base along the rail and vertical movement of the carriage along the mast.

In view of the above, it is clear that at least one communication link needs to be established for communication between the base and the carriage. Nevertheless, providing such a communication link has proved difficult, because of the fact that the carriage is movable with respect to the base of the SRM.

A number of solutions have been proposed. A first proposal is to link the base and the carriage with a flexible wire cable. The flexible wire extends from the base, to the top of the mast, and down to the carriage. When the carriage is descended all the way down to the base, the flexible wire cable is fully extended and there is no excess cable. When the carriage is near the top of the mast, excess cable is present and hangs in the shape of a horseshoe beneath the carriage. Of course, in between, the size of the horseshoe becomes larger and smaller as the carriage is raised and lowered between the top of the mast and the base.

The disadvantage to this approach is that the flexible cable is a high maintenance item. The continuous bending of the cable as the carriage is raised and lowered puts a great deal of mechanical stress on the cable. In time, the continuous bending action causes the wires inside the cable to break. Even in the absence of the bending action, the cable may get caught on a rack or some other physical obstacle, causing the cable to separate into two pieces. Hence, the cable needs to be replaced often, and is therefore a high maintenance item.

A second proposal is to link the base and the carriage with a conductor bar and sliding brush assembly forming a serial communication link. In this system, at least one conductor bar extends from the base to the carriage. A sliding brush is mounted on the carriage which slides along the conductor bar. A first modem is connected to the base end of the conductor bar, and a second modem is connected to the sliding brush. In operation, messages are sent to and from the modems which encode and decode the messages for transmission over the conductor bar.

There are at least two disadvantages to this approach. First, the conductor bar is an electrically noisy communication media. The electric motors used to drive the SRM base, hoist and carriage all generate a great deal of electromagnetic interference. The conductor bar acts as a large antenna and injects this interference into the serial communication link, thereby degrading the performance characteristics of the communication system. Additionally, noise is also generated by the rubbing of the sliding brush against the conductor bar.

Second, sole reliance on a serial link greatly reduces the real-time responsiveness of the SRM control system. "Real-time responsiveness" refers to the amount of time required for the SRM control system to respond to inputs. A machine that is real-time responsive spends less time idle and spends less time doing the wrong thing. For example, when instructing the machine to perform a task, it is preferable for the machine to begin performance of the task right away, rather than spending several seconds processing the instruction. Similarly, when instructing the machine to discontinue an activity, it is preferable for the machine to stop right away, rather than spending several seconds essentially doing the wrong thing.

The SRM control system is less responsive to the inputs it receives through a serial link, because it takes it takes more time for the serial link to transmit those inputs to the supervisory control. For example, assume an operator is using a control panel mounted in a carriage cage to instruct the supervisory control to lift the carriage. The operator's instructions must be formatted for serial transmission, and then must wait their turn to be transmitted over the serial link. Once transmitted, the instructions must be unformatted and the integrity of the transmission must be verified (i.e., error checking). Sometimes, the serial link may be temporarily lost altogether. In practice, it has been found that it may take the supervisory control up to two seconds to respond an instruction from an operator on the carriage. During this time, the carriage will, e.g., continue to ascend the mast in spite of the fact that the operator has instructed the supervisory control to stop carriage movement.

The real-time responsiveness of the SRM control system could be improved by limiting the amount of information that is communicated over the serial communication link. The drawback, of course, is that limiting the amount of information received by the supervisory control may degrade the performance of the SRM control system in other ways.

In short, prior art SRM communication systems suffer the following drawbacks: they are highly sensitive to noise, they are unable to communicate critical information rapidly and thereby degrade the real-time responsive of the SRM control system, and/or their maintenance requirements are unacceptably high. To date, an acceptable SRM communication system which does not suffer these drawbacks has not been developed.

SUMMARY OF THE INVENTION

A communication system for a storage and retrieval machine (SRM) is presented. Specifically, the communication system is used with an SRM having a mast, a base and a carriage which is vertically movable along the mast. The communication system comprises a signal generator, a conductor bar, a base electrical device, a carriage electrical device, a sliding brush, first and second transmitters, and first and second receivers. The conductor bar extends along the mast of the SRM to the carriage. The sliding brush is mounted to the carriage and is in slidable electrical contact with the conductor bar. The transmitters and receivers are coupled to the conductor bar or the sliding brush, depending on the direction of transmission. The first and second transmitters transmit positive half-waves and negative half-waves, respectively, across the conductor bar in response to inputs. Hence, the two sets of transmitters and receivers provide two one-bit intra SRM communication links between the carriage electrical device and the base electrical device.

Also presented is a communication system for communicating high priority messages and low priority messages between a base and carriage of a SRM. The communication system comprises a carriage and base electrical devices, a first conductor bar communication link, and a second optical modem communication link. Specifically, the first communication link includes a conductor bar and a sliding brush which is mounted to the carriage and is in slidable electrical contact with the conductor bar. Further, the first communication link includes a first transmitter and first receiver which are coupled to either (1) the conductor bar and the base electrical device or (2) the sliding brush and the carriage electrical device, depending on the direction of transmission. The first receiver cooperates with the first transmitter to communicate the high priority messages between the carriage electrical device and the base electrical device. Finally, the second communication link includes first and second optical modems. The first optical modem is mounted on the carriage of the SRM and is coupled to the carriage electrical device, and the second optical modem is coupled to the base electrical device. The second optical modem cooperates with the first optical modem to communicate the low priority messages between the carriage electrical device and the base electrical device.

The benefits of the present invention are as follows. First, it permits an increase in the real-time responsiveness of the control system. The present invention dedicates the conductor bar link to the communication of high priority data, and utilizes a serial communication link to communicate low priority data. Each conductor bar preferably transmits only one or two data bits of high priority data; thus, the simplicity of the high priority message makes it possible to transmit the message much faster. Because transmission time is reduced, the control system response time is also reduced, i.e., the real-time responsiveness of the control system is increased.

Second, both the optical modem link and the conductor bar link are relatively immune to noise. High frequency noise is generated in the conductor bars by the electric motors used to drive the base, hoist, and shuttle, and by the rubbing of the sliding brushes against the conductor bar. The optical modem link is relatively immune to the noise because the optical modems do not use the conductor bars. The conductor bar link is relatively immune because relays are used which act as low pass filters. Hence, the relays pass the low frequency message but filter out the high frequency noise.

Third, the use of an optical modem link and a conductor bar link eliminate the need for a long, flexible cable. Unlike the flexible cable, the optical modems and conductor bar and brush assembly are relatively low maintenance items. For example, unlike the flexible cable, the optical modems do not wear out due to the vertical movement of the carriage.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

1. Base/Carriage Communication with Conductor Bar and Optical Modem Links

The general structural/mechanical features of an SRM system are summarized above and are discussed in greater detail in U.S. Pat. Nos. 4,773,807; 5,044,859; 5,091,685 and 5,397,211; which are hereby expressly incorporated by reference. Attention is therefore now placed on a communication system for a storage and retrieval machine according to the present invention.

Figure 1:
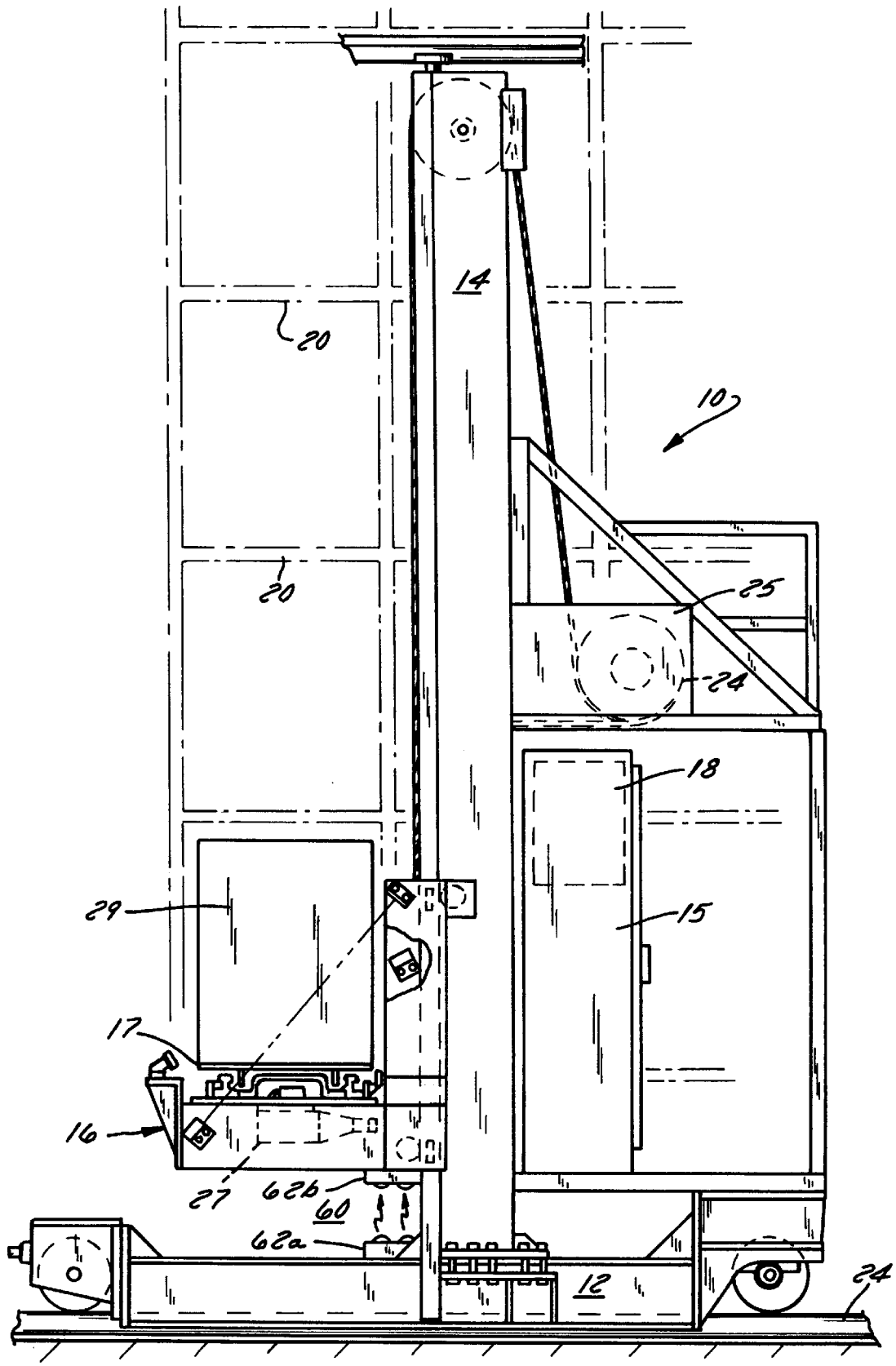
FIG. 1 illustrates a side elevation view of a storage and retrieval machine implementing a communication system in accordance with the present invention.
Figure 2:
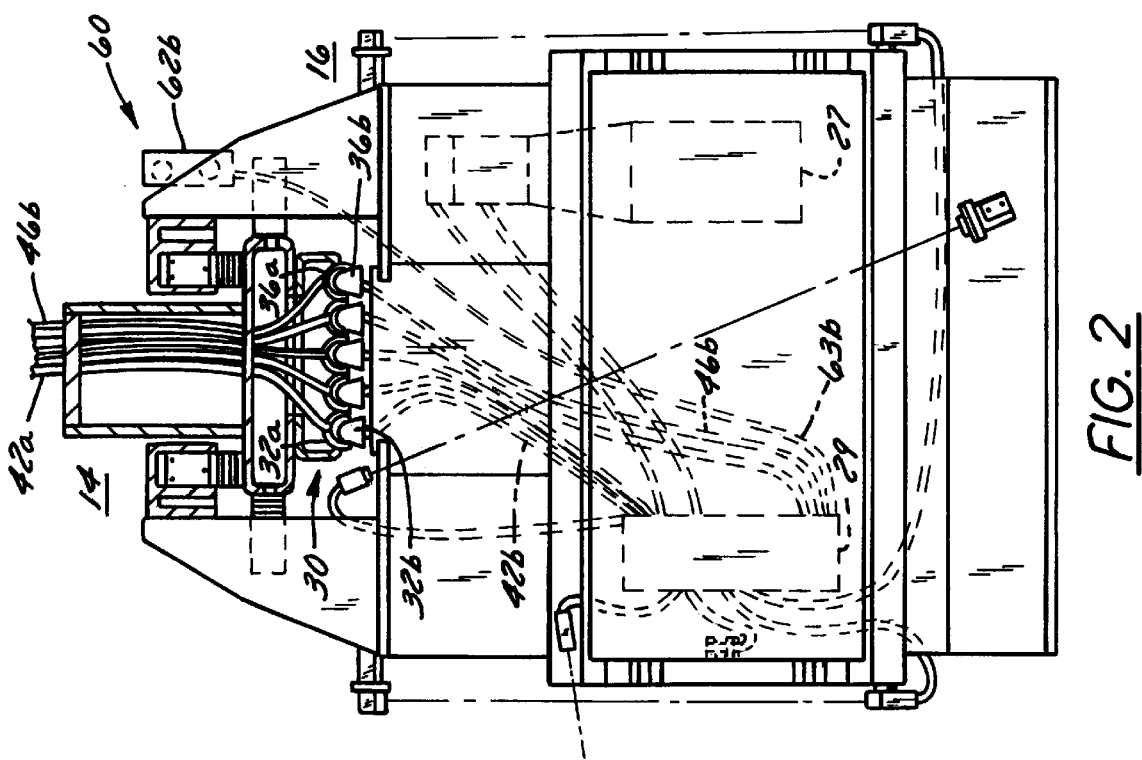
FIG. 2 illustrates a top view of a carriage of a storage and retrieval machine implementing a communication system in accordance with the present invention.
Figure 3:
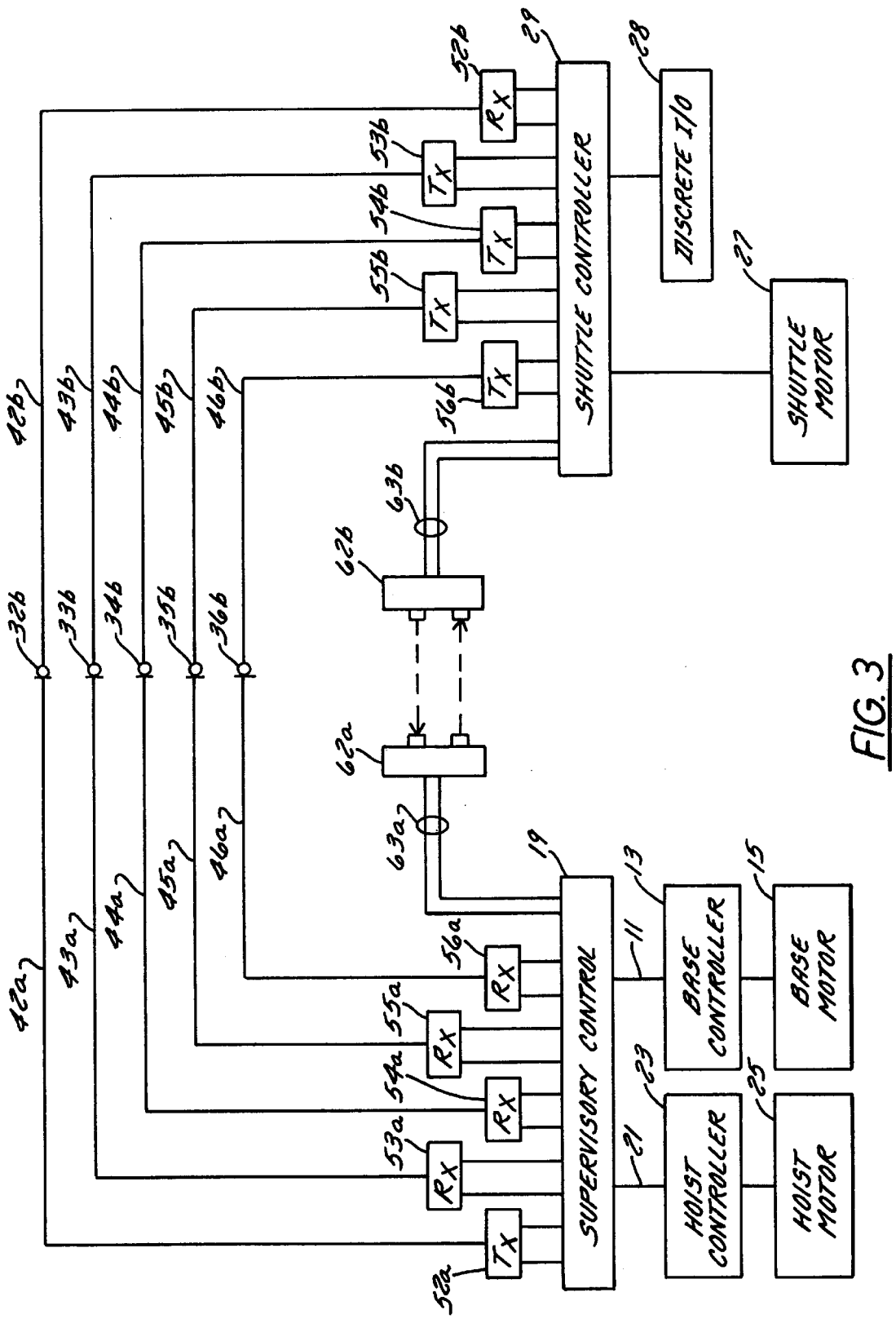
FIG. 3 illustrates a schematic circuit diagram of a communication system for a storage and retrieval machine according to the present invention.

Referring to FIGS. 1–3, a communication system for a storage and retrieval machine according to the present invention is illustrated. The communication system permits communication between the computer 18, which implements a supervisory control 19, and other parts of the control system including a base controller 13, a hoist controller 23, and a shuttle controller 29 further including a plurality of discrete I/O designated generally by discrete I/O block 28.

Since the base controller 13 and the hoist controller 23 are stationary with respect to the computer 18, it is relatively easy to provide a communication link between these devices. The link may simply comprise a pair of cables 11 and 21. With a communication link established, the base controller 13 cooperates with the supervisory control 19 to control the base motor 15, which drives the SRM 10 horizontally on a rail 24. Similarly, the hoist controller 23 cooperates with the supervisory control 19 to control the hoist motor 25, which drives a cable drum assembly 24 thereby causing the carriage 16 to ascend or descend along the mast 14.

In contrast, as discussed above, providing a communication link between the computer 18 and the shuttle controller 29 (and the discrete I/O 28) has proven difficult because the carriage 16 is movable with respect to the base 12. Specifically, the shuttle controller 29 is mounted on the carriage 16, which moves vertically along the mast 14.

The communication system therefore preferably comprises two separate communication links between the base 12 and the carriage 16. The first link is a conductor bar link 30; and the second link is an optical modem link 60.

The first conductor bar link 30 comprises a plurality of cables 42a, 43a, 44a, 45a and 46a which link the computer 18 to a plurality of conductor bars 32a, 33a, 34a, 35a and 36a. The conductor bar link 30 further comprises a plurality of sliding brushes 32b, 33b, 34b, 35b and 36b which each slide along a respective conductor bar 32a–36a as the carriage 16 moves vertically along the mast 14. The sliding brushes 32b–36b are in turn connected to respective cables 42b, 43b, 44b, 45b and 46b which connect the bars 32b–36b to the discrete I/O block 28. As the carriage 16 ascends and descends the mast 14, the brushes 32b–36b slide along respective conductor bars 32a–36a. Hence the conductor bars 32a–36a remain in continuous contact with the brushes 32b–36b, thereby permitting the shuttle controller 29 and the discrete I/O 28 to remain in continuous contact with the supervisory control 19.

The discrete I/O block 28 serves as a general designation for all of the discrete I/O present on the carriage 16. The discrete I/O are inputs/outputs which are binary in nature, i.e. each I/O point is either "on" or "off" and thus constitutes one bit of data. For example, the discrete I/O represent on/off signals from photo eyes, limit switches, safeties, and so on.

Figure 6:
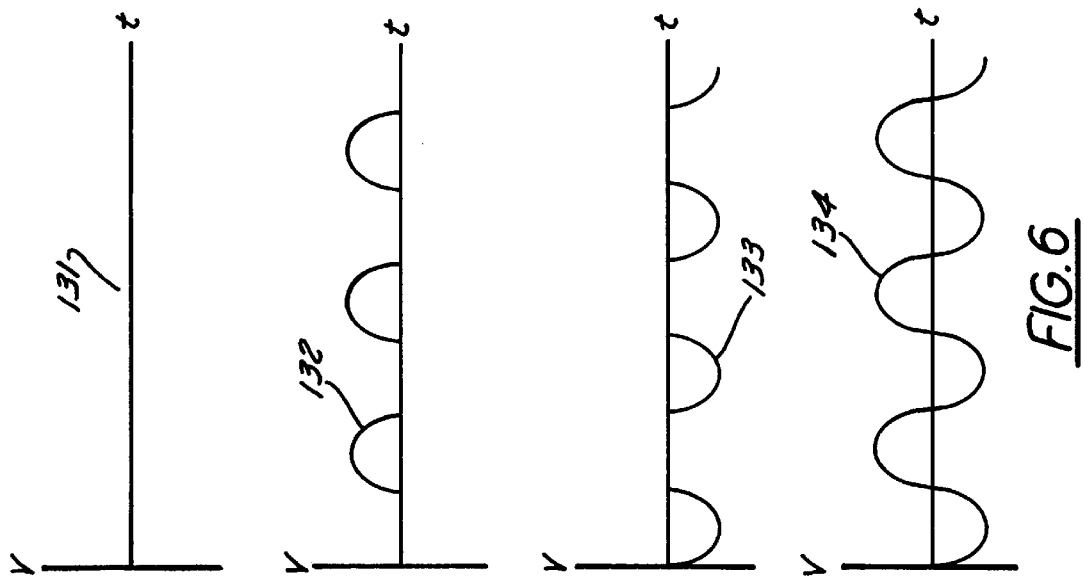
FIG. 6 illustrates four communication signals representing four machine states in a communication system for a storage and retrieval machine according to the present invention.
Figure 4:
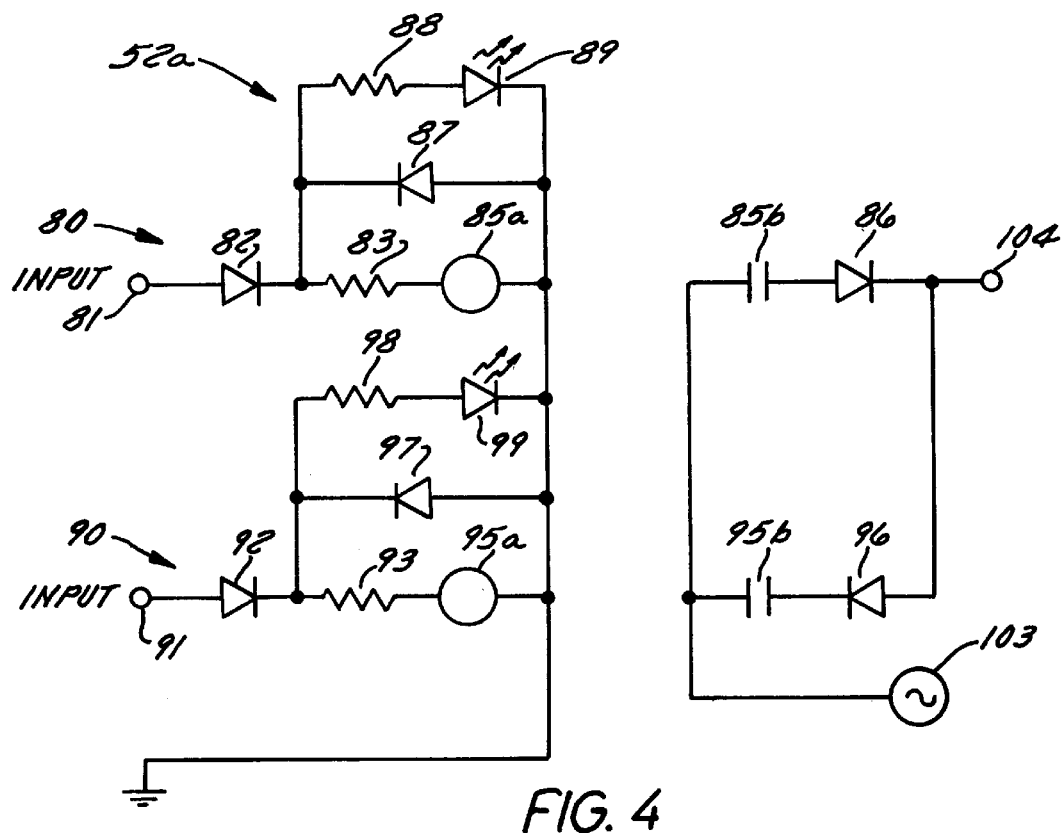
FIG. 4 illustrates two conductor bar transmitters for a storage and retrieval machine communication system according to the present invention.
Figure 5:
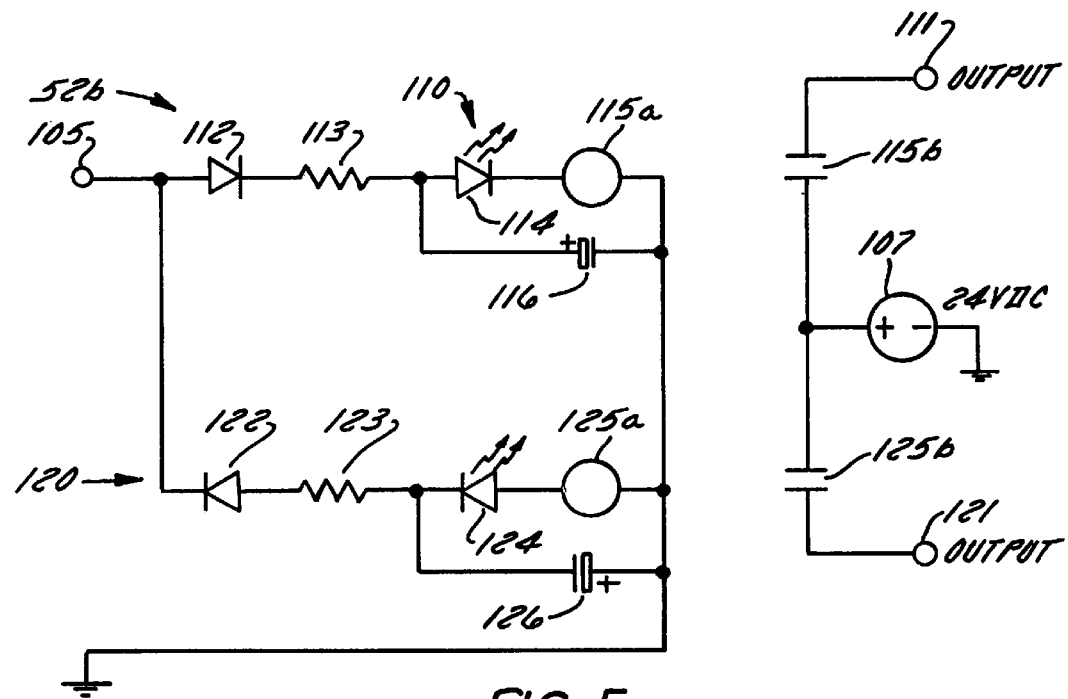
FIG. 5 illustrates two conductor bar receivers for a storage and retrieval machine communication system according to the present invention.

To minimize the amount of time required to transmit data over the conductor bar link 30, each conductor bar is used to transmit only one or two bits of I/O data. Preferably, an interface circuit is disposed between the computer 18 and each of the conductor bars 32a–36a, and between each of the sliding brushes 32b–36b and the electrical device on the carriage 16. Two of the interface circuits 52a and 52b are illustrated in FIGS. 4–6, discussed in greater detail below.

The simplicity of the high priority message makes it possible to transmit the message much faster. Because only one or two bits are transmitted, it is unnecessary to encode (and subsequently decode) the message for serial transmission. Additionally, the data bits are transmitted almost immediately rather than waiting in line behind other data bits. Hence, because transmission time is reduced, the control system response time is also reduced, i.e., the real-time responsiveness of the control system is increased.

Generally, the bits that are transmitted over the conductor bar link 30 are considered to be "high priority data." Generally, with high priority data, the timing of the message is important and impacts the real-time responsiveness of the control system. For example, one bit of data that is transmitted over the conductor bar link 30 comes from an emergency stop switch. The emergency stop switch is closed in emergency situations and is used to stop the motion of the SRM 10. Obviously, it is desirable to transmit this bit in as short a time period as possible. Other high priority data include data relating to the movement of the SRM 10. For example, when the supervisory control 19 concludes that the base 12 and the carriage 16 have reached their desired destinations, an auto extend signal is sent via the conductor bar link 30 (i.e., a bit on the conductor link goes from low to high or vice versa). The auto extend signal instructs the shuttle controller 29 to extend the shuttle 17 into a selected rack 20. Because the auto extend command is sent via the conductor bar link 30 (and not via a slower serial communication link), the SRM 10 is able to perform its task as much as two seconds faster.

As illustrated, the discrete I/O block 28 is coupled to the shuttle controller 29 (i.e., rather than directly to the transmitter and receiver interfaces 52b–56b). This permits more efficient utilization of the conductor bar link 30, because it permits the supervisory control 19 and the shuttle controller 29 to intelligently alter the meaning of the transmitted bits depending on the mode of operation of the SRM 10. For example, the SRM 10 may be in an automatic mode of operation, i.e., in which the SRM 10 automatically travels from rack location to rack location retrieving and depositing loads. In this case, a particular bit may be interpreted as an instruction to the shuttle controller 29 to center the shuttle table 17. Alternatively, the SRM 10 may be in a maintenance mode of operation, i.e., in which an human operator located near the base 12 provides manual instructions to the SRM 10. In this case, that same bit may instead be interpreted as an instruction to the shuttle controller to incrementally extend the shuttle table 17 to the right. The mode of operation may itself be one of the bits of the conductor bar link. (Hence, although the conductor bar link comprises a plurality of one-bit links, the high priority messages may utilize more than a single one-bit link.) By altering the meaning of the bits, it is generally possible to utilize all of the bits during each of the modes of operation of the SRM 10.

A second link 60 comprises optical modems 62a and 62b which provide a serial communication link between the base 12 and the carriage 16. The optical modem 62a is mounted to the base 12 of the SRM 10. The computer 18 is connected to the optical modem 62a by a cable 63a. The optical modem 62a communicates with the optical modem 62b, which is mounted on the carriage 16 directly above the optical modem 62a, by transmitting and receiving infrared light pulses. The optical modem 62b is connected to the shuttle controller 29 by a cable 63b.

As the carriage 16 ascends and descends the mast 14, the optical modems 62a and 62b remain within optical contact of each other. In other words, the optical modem 62a remains directly below the optical modem 62b; the horizontal position of the modem 62a does not change with respect to the position of the modem 62b. All that changes is the vertical distance between the two modems.

Preferably, low priority messages are transmitted over the optical modem link 60. Generally, for low priority messages, the timing of the message is less important. Low priority messages may contain information that is sent well in advance of when it is needed. For example, as the SRM base 12 and the carriage 16 are traveling toward their desired destinations, the supervisory control 19 may send an extend distance to the shuttle controller 29. The extend distance informs the shuttle controller 29 how far to extend the shuttle into the next rack location. The timing of this message is not as critical as the timing of other messages. Generally, it is acceptable for the shuttle controller 29 to receive this distance at any time before the base 12 and the carriage 16 reach their desired destinations. The message may be sent well in advance, e.g., as soon as the SRM 10 learns its next destination. In this case, the fact that the optical modem link 60 may take as much as two seconds to transmit the extend distance to the shuttle controller 29 is not problematic, since the extend distance will nevertheless reach the shuttle controller 29 well in advance of when it is needed.

As another example, the issuance of a fault by the shuttle controller 29 will cause the shuttle controller 29 to transmit the status of all I/O points to the supervisory control 19. Given that a fault has been issued (and therefore the SRM is stopped), it is not critical for the I/O points to be transmitted to the supervisory control 29 as soon as possible. A two second delay is acceptable, since the SRM 10 is no longer performing normal tasks anyway.

In short, high priority messages are reduced to one-bit messages and rapidly/safely transmitted over the conductor bar link 30, whereas low priority messages are transmitted over the optical modem link 60. By segregating messages into low priority messages and high priority messages, the real-time responsiveness of an SRM control system can be increased. In practice, it has been found that such a strategy may increase the real-time responsiveness of the system by as much as fifteen percent.

2. Two Bit Communication Over a Single SRM Conductor Bar

As discussed above, the conductor bar link 30 preferably comprises transmitter and receiver circuits which permit two bits of I/O data to be transmitted over a single conductor bar. FIG. 4 illustrates a transmitter interface 52a comprising first and second transmitters 80 and 90, and FIG. 5 illustrates a receiver interface 52b comprising first and second receivers 110 and 120. As illustrated in FIG. 6, the transmitter interface 52a divides a sine wave into positive and negative half-waves. Each half-wave then designates a bit such that the presence or absence of half-waves designates the respective bit as being "on" or "off."

The transmitter interface 52a is illustrated in FIG. 4. The first transmitter comprises components 81–89 and controls whether the positive half-wave is transmitted. The second transmitter 90 comprises components 91–99 and controls whether the negative half-wave is transmitted.

The input 81 of the first transmitter 80 is a 24 vdc signal output of the shuttle controller 29. The 24 vdc signal (or absence thereof) corresponds to a bit being "on"or "off." Current from the 24 vdc input travels through a diode 82, a resistor 83, and a relay coil 85a, thereby energizing the coil 85a. The energization of the coil 85a causes a relay contact 85b to close. The closure of the relay contact 85b causes current to flow from a 120 vac supply 103, through the relay contact 85b, through a diode 86, and out as a half-wave rectification output 104. The half-wave rectification output 104 is connected to the conductor bar 32a. Note that, due to the presence of the diode 86, only the positive half-waves of the 120 vac supply 103 are transmitted on the conductor bar when a 24 vdc signal is applied only at input 81.

A positive half-wave from the first transmitter 80 travels over the conductor bar 32a, to the sliding brush 32b, whereafter it is received at an input 105 of the receiver interface 52b, illustrated in FIG. 5. Similar to the transmitter interface 52a, the receiver interface 52b comprises first and second receivers 110 and 120. The first receiver 110 comprises components 111–116 and receives positive half-wave inputs. The second receiver 120 comprises components 121–126 and receives negative halfwave inputs.

When the positive half-wave is received at the input 105, the diode 112 permits the half-wave to travel through the first receiver 110, and the diode 122 prevents the positive half-wave from traveling through the second receiver 120. After traveling through the diode 112, the positive half-wave travels through resistor 113, through diode 114, and through coil 115a, thereby energizing the coil 115a. The energization of the coil 115a cause the relay contact 115b to close. A 24 vdc supply is connected to input 107, thereby causing a 24 vdc output to appear at output 111.

At the end of the positive half-wave, a substantial amount of current has built up in the coils 85a and 115a. Therefore, to protect the coil 85a in the first transmitter, a shunt diode 87 is provided which permits the current built up in the coil 85a to discharge. In the first receiver 110, a similar protective function is performed by the capacitor 116 in combination with the diode 114.

Finally, the first transmitter 80 preferably includes a resistor 88 in series with a light emitting diode (LED) 89. Since LED 89 is oriented in the same manner as diode 82, LED 89 permits current flow when a 24 vdc signal is applied to input 81. The LED 89 therefore aids system troubleshooting by indicating the presence of a 24 vdc signal at the input 81. Similarly, LED 114 in the first receiver 110 is oriented in the same manner as the diode 112. LED 114 emits light when a positive half-wave is received at the receiver interface 52b. Hence, assuming that the system is working properly, a 24 vdc input at input 81 causes both the LED 89 and the LED 114 to emit light. Preferably, the LEDs 89 and 114 are both the same color.

The second transmitter 90 and the second receiver 120 are similar in structure and operation to the first transmitter 80 and first receiver 110. Specifically, the input 91 of the second transmitter 90 is a 24 vdc signal output of the shuttle controller 29. The 24 vdc signal (or absence thereof) corresponds to a bit being "on" or "off." Current from the 24 vdc input travels through a diode 92, a resistor 93, and a relay coil 95a, thereby energizing the coil 95a. The energization of the coil 95a causes a relay contact 95b to close. The closure of the relay contact 95b causes current to flow from a 120 vac supply 103, through the relay contact 95b, through a diode 96, and out the half-wave rectification output 104. The half-wave rectification output 104 is connected to the conductor bar 32a. Note that, due to the presence of the diode 96, only the negative half-waves of the 120 vac supply 103 are transmitted on the conductor bar 32a when a 24 vdc signal is applied only at input 91. However, if 24 vdc signals are applied to both of the inputs 81 and 91, then both the positive half-waves and the negative half-waves of the 120 vac supply 103 will be transmitted on the conductor bar 32a.

A negative half-wave from the second transmitter 90 travels over the conductor bar 32a, to the sliding brush 32b, whereafter it is received at an input 105 of the receiver interface 52b, illustrated in FIG. 5. The diode 122 permits the negative half-wave to travel through the second receiver 120, and the diode 112 prevents the negative half-wave from traveling through the first receiver 110. After traveling through the diode 122, the negative half-wave travels through resistor 123, through diode 124, and through coil 125a, thereby energizing the coil 125a. The energization of the coil 125a causes the relay contact 125b to close. A 24 vdc supply is connected to input 107, thereby causing a 24 vdc output to appear at output 121.

At the end of the negative half-wave, a substantial amount of current has built up in the coils 95a and 125a. Therefore, to protect the coil 95a in the second transmitter, a shunt diode 97 is provided which permits the current built up in the coil 95a to discharge. In the second receiver 120, a similar protective function is performed by the capacitor 126 in combination with the diode 124.

Finally, the second transmitter 90 preferably includes a resistor 98 in series with an LED 99. Since LED 99 is oriented in the same manner as diode 92, LED 99 permits current flow when a 24 vdc signal is applied to input 91. The LED 99 therefore aids system trouble-shooting by indicating the presence of a 24 vdc signal at the input 91. Similarly, LED 124 in the second receiver 120 is oriented in the same manner as the diode 122. LED 124 emits light when a negative half-wave is received at the receiver interface 52b. Hence, assuming that the system is working properly, a 24 vdc signal at input 91 causes both the LED 99 and the LED 124 to emit light. Preferably, the LED 99 and LED 124 are the same color, and are a different color than the LEDs 89 and 114.

As illustrated in FIG. 3, most of the transmitters are located on the carriage 16 and most of the receivers are located on the base 12. This is because most of the sensors are located on the carriage 16. Additionally, the shuttle controller 29 is not generally concerned about sensors located on the base 12, whereas the supervisory control is concerned about sensors located on the carriage 16.

FIG. 6 illustrates four possible signals that can be transmitted over a single conductor bar using the transmitters and receivers of the present invention. The four signals are different in that each represents a different combination of positive and negative half-waves that are "on" or "off." The four different signals may be used to represent four different machine states of the SRM 10.

Advantageously, therefore, the present invention permits two bits of data to be communicated on a conductor bar rather than just one bit of data. The benefit is that more messages may be communicated via the conductor bar link 30. Since more messages travel via the faster link, the SRM control system is able to respond quickly to more messages, i.e., the real-time responsiveness of the control system is increased.

Further, the present invention advantageously utilizes relays. Relays provide two benefits. First, the relays filter the noise on the conductor bars 32b–36b in the conductor bar link 30. High frequency noise pulses are generally not sufficient to cause the relay contacts to close.

Additionally, relays permit the use of fail-safe wiring. Specifically, a master control relay may be coupled to the shuttle controller 29. In the event that the shuttle controller 29 detects a system fault, the shuttle controller 29 may de-energize the master control relay. The master control relay ties both carriage power and base power into a single circuit, such that de-energizing the master control relay causes all motion to stop. Hence, the use of relays permits the use of a highly reliable safety mechanism.

Many changes and modifications could be made to the invention without departing from the spirit thereof. For example, the interfaces 52a and 52b could easily be modified so that each is a transmitter/receiver interface. In other words, the interface 52 could instead comprise the transmitter 80 coupled to the receiver 120, and the interface 52b could instead comprise the transmitter 90 coupled to the receiver 110. (The positive and negative half-waves need not necessarily propagate from the same end of the conductor bar.) The scope of this and other changes will become apparent from the appended claims.

We claim:

1. A communication system for a storage and retrieval machine having a mast, a base and a carriage, said carriage being vertically movable along said mast, said communication system comprising:

a signal generator supplying a signal having positive and negative half-waves;

a conductor bar extending along said mast of said storage and retrieval machine to said carriage;

a base electrical device mounted to said base of said storage and retrieval machine;

a sliding brush, said sliding brush being mounted to said carriage, and said sliding brush being in slidable electrical contact with said conductor bar;

a carriage electrical device mounted to said carriage of said storage and retrieval machine;

a first transmitter and a first receiver, one of said first transmitter and said first receiver being coupled to said base electrical device and to said conductor bar, the other of said first transmitter and said first receiver being coupled to said carriage electrical device and to said sliding brush, said first transmitter being further coupled to said signal generator, and said first transmitter defining means for transmitting said positive half-waves across said conductor bar to said first receiver in response to an input of said first transmitter and thereby defining a first one-bit intra storage and retrieval machine communication link between said carriage electrical device and said base electrical device; and a second transmitter and a second receiver, one of said second transmitter and said second receiver being coupled to said base electrical device and to said conductor bar, the other of said second transmitter and said second receiver being coupled to said carriage electrical device and to said sliding brush, said second transmitter being further coupled to said signal generator, and said second transmitter defining means for transmitting said negative half-waves across said conductor bar to said second receiver in response to an input of said second transmitter and thereby defining a second one-bit intra storage and retrieval machine communication link between said carriage electrical device and said base electrical device.

2. A communication system for a storage and retrieval machine according to claim 1, wherein said first transmitter comprises a first transmitter relay, said first transmitter relay closing in response to said transmitter input, said closure of said first transmitter relay permitting said positive half-waves of said signal generator to be transmitted on said conductor bar; and a first receiver relay, said first receiver relay closing in response to said positive half-waves transmitted on said conductor bar, said first receiver relay forming an output of said first receiver;

and wherein said transmitter and receiver relays further define means for filtering noise in said first one-bit intra storage and retrieval machine communication link.

3. A communication system for a storage and retrieval machine according to claim 1, wherein said base electrical device is a computer implementing a supervisory control.

4. A communication system for a storage and retrieval machine according to claim 3, wherein said carriage electrical device includes first and second sensors and a shuttle controller, said first and second sensors being coupled to said shuttle controller, said shuttle controller being coupled to said first and second transmitters, and said first and second transmitters being coupled to said sliding brush.

5. A communication system for a storage and retrieval machine according to claim 4; wherein said shuttle controller and said supervisory control define means for altering the meaning of bits transmitted over said first and second one-bit intra storage and retrieval machine communication links.

6. A communication system for a storage and retrieval machine according to claim 1, further comprising a first optical modem, said first optical modem being mounted on said carriage of said storage and retrieval machine;

a second optical modem, said second optical modem cooperating with said first optical modem to provide a third intra storage and retrieval machine communication link between said carriage electrical device and said base electrical device;

and wherein said first and second communication links communicate high priority messages, and said third communication link communicates low priority messages.

7. A communication system for communicating high priority messages and low priority messages, said communication system comprising:

a first electrical device;

a second electrical device, said second electrical device being mounted to a carriage, said carriage being movable along an axis of motion;

a first communication link, said first communication link including a conductor bar extending along said axis of motion of said carriage, a sliding brush, said sliding brush being mounted to said carriage and being in slidable electrical contact with said conductor bar, a first transmitter, said first transmitter being coupled to one of (1) said conductor bar and said first electrical device and (2) said sliding brush and said second electrical device, a first receiver, said first receiver being coupled to the other of (1) said conductor bar and said first electrical device and (2) said sliding brush and said second electrical device, and wherein said first transmitter and said first receiver cooperate so as to define a one-bit communication link that communicates said high priority messages between said first electrical device and said second electrical device; and a second communication link, said second communication link including a first modem, said first modem being coupled to said first electrical device, a second modem, said second modem being mounted on said carriage and being coupled to said second electrical device, and wherein said first modem and said second modem cooperate so as to define a serial communication link that communicates said low priority messages between said first electrical device and said second electrical device.

8. A communication system according to claim 7, further comprising a signal generator supplying a signal having positive and negative half-waves, said first transmitter transmitting said positive half-waves of said sine wave across said conductor bar;

a second transmitter, said second transmitter being coupled to one of (1) said conductor bar and said first electrical device and (2) said sliding brush and said second electrical device, and said second transmitter transmitting said negative half-waves across said conductor bar;

a second receiver, said second receiver being coupled to the other of (1) said conductor bar and said first electrical device and (2) said sliding brush and said second electrical device, said second receiver cooperating with said second transmitter to communicate said high priority messages between said carriage electrical device and said base electrical device.

9. A communication system according to claim 8, wherein said first electrical device and said second electrical device define means for altering the meaning of bits transmitted from said first transmitter to said first receiver and from said second transmitter to said second receiver.

10. A communication system according to claim 7, wherein said first transmitter comprises a first transmitter relay, said first transmitter relay closing in response to a transmitter input, said closure of said first transmitter relay permitting positive half-waves of a signal generator to be transmitted on said conductor bar; and a first receiver relay, said first receiver relay closing in response to said positive half-waves transmitted on said conductor bar, said first receiver relay forming an output of said first receiver;

and wherein said transmitter and receiver relays define means for filtering noise on said conductor bar.

11. A communication system according to claim 7, wherein said high priority messages and said low priority messages are communicated between a base and carriage of a storage and retrieval machine.

12. A communication system for communicating high priority messages and low priority messages within a storage and retrieval machine, said storage and retrieval machine having a mast, a base and a carriage, said carriage being vertically movable along said mast, said communication system comprising:

a carriage electrical device mounted to said carriage of said storage and retrieval machine;

a base electrical device mounted to said base of said storage and retrieval machine;

a first communication link, said first communication link including a conductor bar extending along a mast of said storage and retrieval machine, a sliding brush, said sliding brush being mounted to said carriage and being in slidable electrical contact with said conductor bar, a first transmitter, said first transmitter being coupled to one of (1) said conductor bar and said base electrical device and (2) said sliding brush and said carriage electrical device, a first receiver, said first receiver being coupled to the other of (1) said conductor bar and said base electrical device and (2) said sliding brush and said carriage electrical device, said first receiver and said first transmitter defining means for communicating said high priority messages between said carriage electrical device and said base electrical device; and a second communication link, said second communication link including a first optical modem, said first optical modem being mounted on said carriage of said storage and retrieval machine and being coupled to said carriage electrical device, a second optical modem, said second optical modem being coupled to said base electrical device, and said second optical modem and said first optical modem defining means for communicating said low priority messages between said carriage electrical device and said base electrical device.

13. A communication system according to claim 12, further comprising a signal generator supplying a signal having positive and negative half-waves, said first transmitter transmitting said positive half-waves across said conductor bar;

a second transmitter, said second transmitter being coupled to one of (1) said conductor bar and said base electrical device and (2) said sliding brush and said carriage electrical device, and said second transmitter transmitting said negative half-waves across said conductor bar;

a second receiver, said second receiver being coupled to the other of (1) said conductor bar and said base electrical device and (2) said sliding brush and said carriage electrical device, said second receiver cooperating with said second transmitter to communicate said high priority messages between said carriage electrical device and said base electrical device.

14. A communication system according to claim 13, wherein said first transmitter and said first receiver define a first one-bit intra storage and retrieval machine communication link, wherein said second transmitter and said second receiver define a second one-bit intra storage and retrieval machine communication link.

15. A communication system according to claim 14, wherein said base electrical device and said carriage electrical device define means for altering the meaning of bits transmitted over said first and second one-bit intra storage and retrieval machine communication links.

16. A communication system according to claim 13, wherein said second optical modem is mounted to said base of said storage and retrieval machine.

17. A communication system according to claim 12, wherein said first transmitter comprises a first transmitter relay, said first transmitter relay closing in response to a transmitter input, said closure of said first transmitter relay permitting positive half-waves of a signal generator to be transmitted on said conductor bar; and a first receiver relay, said first receiver relay closing in response to said positive half-waves transmitted on said conductor bar, said first receiver relay forming an output of said first receiver;

and wherein said transmitter and receiver relays define means for filtering noise on said conductor bar.

18. A method of communicating high priority messages and low priority messages between a base and a carriage of a storage and retrieval machine, the method comprising:

A. establishing a low priority communication link between said base and said carriage, said low priority communication link comprising a first modem which is associated with said base and a second modem which is associated with said carriage;

B. establishing a high priority communication link, said high priority communication link comprising a first transmitter, a first receiver, a second transmitter, and a second receiver, said first transmitter being adapted for transmitting positive half-waves to said first receiver and said second transmitter being adapted for transmitting negative half-waves to said second receiver, and two of said first transmitter, said first receiver, said second transmitter, and said second receiver being associated with one of said base and said carriage and the other two being associated with the other of said base and said carriage;

C. generating a low priority message;

D. transmitting said low priority message over said low priority communication link;

E. generating a high priority message; and

F. transmitting said high priority message over said high priority communication link, including the step of transmitting one bit of information by transmitting either said positive half-waves or said negative half-waves using either said first transmitter or said second transmitter;

wherein steps (C), (D), (E) and (F) occur regularly during operation of said storage and retrieval machine; and wherein an amount of time which separates performances of step (E) and corresponding performances of step (F) is insubstantial as compared to an amount of time which separates performances of step (C) and corresponding performances of step (D), such that said high priority messages are transmitted substantially without delay.

19. A method of communicating between a base and a carriage of a storage and retrieval machine, the method comprising:

providing a conductor bar, said conductor bar electrically coupling said base to said carriage by way of (1) a first receiver and a first transmitter which are disposed on electrically opposite sides of said conductor bar, and (2) a second receiver and a second transmitter which are disposed on electrically opposite sides of the conductor bar;

generating a signal having positive and negative half-waves;

transmitting a first bit of information across said conductor bar, including the step of transmitting said positive half-waves across said conductor bar to said first receiver in response to an input of said first transmitter; and transmitting a second bit of information across said conductor bar, including the step of transmitting said negative half-waves across said conductor bar to said second receiver in response to an input of said second transmitter.

20. A communication system for communicating between a base and a carriage of a storage and retrieval machine, said communication system comprising:

A. a first electrical device;
B. a second electrical device, said second electrical device being mounted to a carriage, said carriage being movable along an axis of motion;
C. a first communication link, said first communication link including
  1. a conductor bar extending along said axis of motion of said carriage,
  2. a sliding brush, said sliding brush being mounted to said carriage and being in slidable electrical contact with said conductor bar,
  3. a first transmitter, said first transmitter being coupled to one of (1) said conductor bar and said first electrical device and (2) said sliding brush and said second electrical device, and
  4. a first receiver, said first receiver being coupled to the other of (1) said conductor bar and said first electrical device and (2) said sliding brush and said second electrical device; and
D. a second communication link, said second communication link including
  1. a first modem, said first modem being associated with said base and being coupled to said first electrical device, and
  2. a second modem, said second modem being associated with said carriage and being coupled to said second electrical device.

* * * * *